3,021,596
VERY THIN WALL TUBING
Joseph Wilson Yowell, Hillspoint Road, Westport, Conn., and Donald B. Miner, Orange Center Road, Orange, Conn.
Filed Jan. 30, 1958, Ser. No. 712,207
6 Claims. (Cl. 29—544)

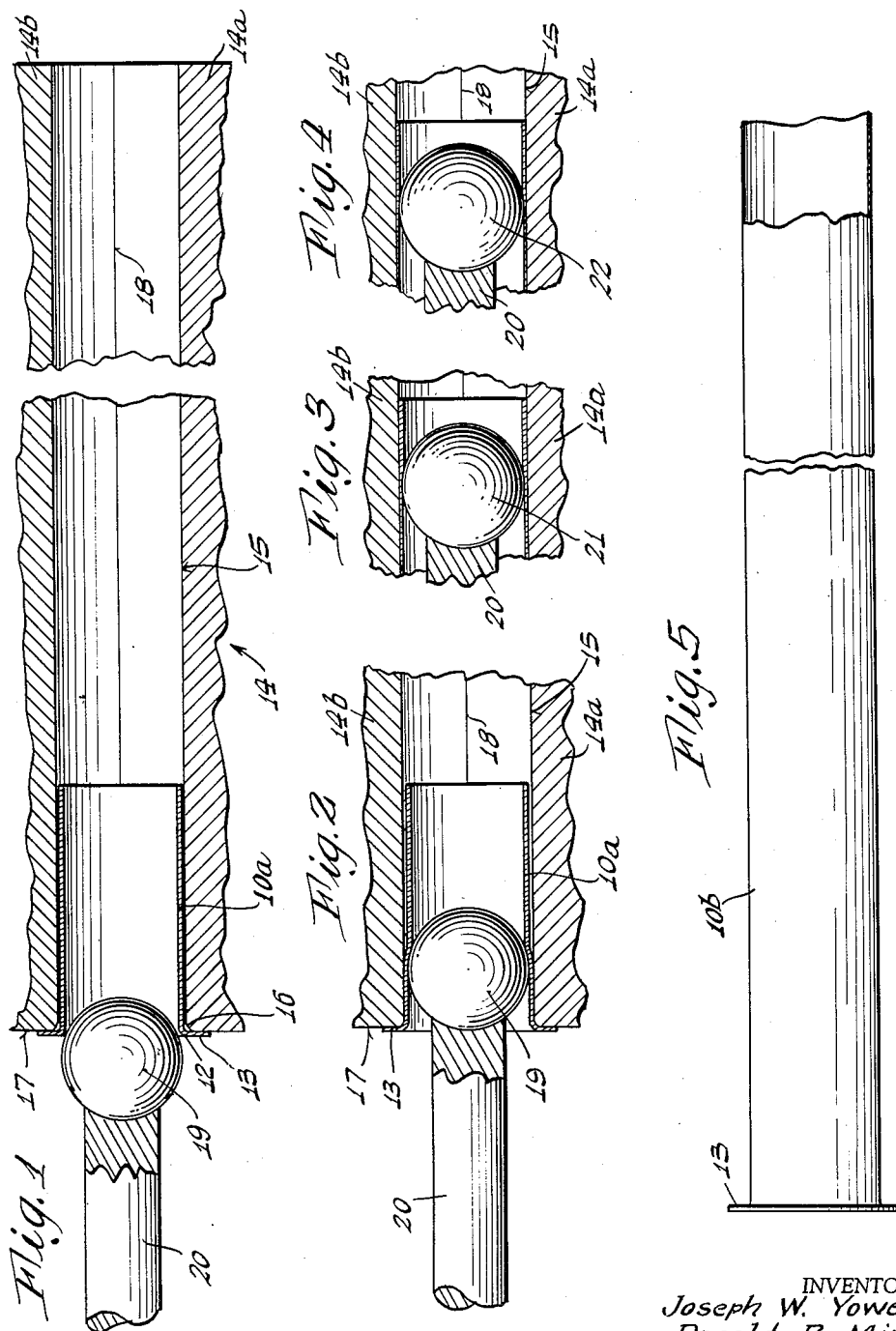

The present invention relates to the manufacture of very thin-walled tubing which for the purpose of this invention means tubing having a wall thickness less than .005 inch. The invention includes the method of working tubing to desired dimensions within small tolerances and further includes the article resulting from the method. The invention is especially useful for working commercially available relatively thick-wall tubing to a very thin wall tubing having a wall thickness of accurate dimension.

Tubing, such as seamless, is generally produced in commercial quantities by drawing a length of it through a series of dies which by gradually reducing the difference between the inside diameter and the outside diameter, decreases the wall thickness of the tubing. While this method is satisfactory for producing tubing having a general minimum wall thickness of .010 inch and wall thickness tolerances on the order of plus or minus .001 inch, it is incapable of satisfactorily fabricating tubing having very close tolerances, i.e. plus or minus .0002 inch, and tubing having very thin wall thickness, i.e. less than .005 inch. Moreover such a commercial production method does not lend itself to the manufacture of small lots of tubing having non-standard dimensions.

Very thin wall tubing having dimensions held within close tolerances is particularly useful and necessary in many applications such as in the manufacture of bellows, flexible tubing, scientific instruments and in locations, as aircraft, where weight is of importance.

It is an object of the present invention to provide a novel method of working standard sized tubing to produce tubing having very thin wall thickness.

Another object of the present invention is to provide for the working of tubing to desired dimensions with relatively small variations in the dimensions.

A further object of the present invention is to provide a method of the above type in which the wall thickness of comparatively thick-wall tubing such as the now commercially available tubing may be reduced to a minimum wall thickness or easily terminated at any desired final wall thickness therebetween.

In carrying out the present invention there is initially provided a length of standard sized, commercially available tubing such as seamless copper alloy, stainless steel, etc. This tubing is cold-worked, according to the present invention, by containing the outside of the tubing in a cylindrical aperture formed in a jig to limit and maintain the outside diameter of the tubing substantially constant and equal to the dimensions of the aperture. Objects of increasing size are relatively forced through the tubing to cause an increase in the inside diameter of the tubing which decreases the wall thickness and also causes elongation of the tubing. This may be accomplished by holding the jig and tubing stationary and moving the object or by holding the object stationary and moving the jig and tubing relatively thereto.

More specifically, the objects are spherical balls (though torpedoes may be used) having diameters held within very small tolerances with sequentially utilized balls having slightly larger diameters so that each ball only decreases the thickness of the tubing by a small amount. The dimensions of the aperture in the jig are also held within very close tolerances and thus the outside diameter of the tubing is consequently held within very close tolerances. The tubing is prevented from axial displacement relative to the aperture as the balls are forced through it, according to the present invention, by restraining the end of the tubing into which the balls are introduced, while the other end of the tubing is free to move axially in the aperture as the tubing is elongated. The restraining of the tubing is very simply accomplished in the specific embodiment of the invention illustrated herein merely by flaring the restrained end of the tubing so that it abuts the top surface of the jig which defines the entrance to the aperture.

The drawings illustrate one form of apparatus and successive steps in practicing the method of making very thin wall tubing in accordance with this invention.

In the drawing:

FIGURE 1 is a view partly in section showing the parts positioned to perform the initial step for sizing tubing according to the present invention.

FIG. 2 is similar to FIG. 1, differing in that it shows the first ball being partially within the tubing as it is forced therethrough.

FIGS. 3 and 4 are partial, sectional views showing the tubing with balls of increasing diameter being forced therethrough.

FIG. 5 is a length of the finished tubing.

Referring to the drawing, the present invention provides for working a length of standard, thick-wall commercially available, original tubing 10a to produce a length of final tubing 10b shown in FIG. 5 which has a longer length, thinner wall thickness held within closer tolerances and in which its characteristics, such as ductility, have been altered by the cold-working of the present invention. The original tubing 10a, as shown in FIG. 1, has a relatively short length and may have a wall thickness of approximately .010 inch. It is flared at one end 12 to provide an annular lip 13. The tubing 10a is positioned within a jig 14 which has formed therein a cylindrical aperture 15, whose diameter corresponds substantially to the desired outside diameter of the finished tubing 10b. The diameter of the aperture is held to very close tolerances as by honing and the entrance to the aperture is chamfered or rounded as at 16. The lip 13 of the tubing 10a overlaps a surface 17 of the jig 14 which defines the entrance to the aperture. While a clamp may be used to maintain the lip 13 on the surface 17, it has been found that a clamp is generally not necessary in carrying out the method of the present invention, though such may be used if required.

The jig 14 is preferably formed of two separable sections 14a and 14b each of which has a semi-circular trough in order to facilitate insertion of the tubing 10a and the removal of the finished tubing 10b. The sections are separable along a parting line 18 and may be held together in any well known manner which provides accurate alignment of the two sections and prevents the parting line 18 from producing a flashing on the finished tubing 10b.

In carrying out the present invention, the tubing 10a is selected to have dimensions in which its maximum outside diameter is substantially equal to or slightly less than the diameter of the aperture 15 and which has the smallest wall thickness available. After an end 12 has been flared the tubing is placed in the aperture 15 with the lip 13 overlapping the surface 17. A spherical ball 19 is introduced into the end 12 and is forced through the tubing 10a by a plunger 20 which may be either hydraulic or mechanical. In order to prevent too high a unit load on the ball which would be apt to deform it, the end of the plunger 20 is spherically concave.

The diameter of the ball 19 is preferably equal to the diameter of the aperture 15 less twice the nominal wall thickness of the tubing 10a in order that the passage of this ball through the tubing will merely enlarge the tubing without initially attempting to decrease the wall thickness of the tubing, though of course some thinning of the wall is inevitable. Thus the outside diameter of the tubing will first be enlarged to be substantially equal to the inside diameter of the aperture 15. Of course, if the tolerances in the tubing 10a are large, or if there is a substantial difference between the outside diameter of the tubing 10a and the diameter of the aperture 15, the enlarging of the outside diameter of the tubing may be done in steps using balls of increasing diameter.

In order to decrease the wall thickness from .010 inch, for example, to a minimum which may be on the order of .003 inch to .001 inch or even less, successive balls 21 and 22 are pushed through the tubing by the plunger 20, as shown in FIGS. 3 and 4, with each ball being individually pushed therethrough, though the balls may be pushed through all at once provided provision is made for accommodating the elongation of the tube between the balls. These balls each successively have a slightly larger diameter and as they are forced through they decrease the wall thickness and elongate the tubing 10a to finally produce the length of tubing 10b as shown in FIG. 5. The length of the final tubing 10b is not particularly critical since it may be shortened to the desired length when the lip 13 is removed. To aid in determining what length of original tubing 10a is required to produce a desired final length, use may be had of the approximation that the ratio of the length of original tubing 10a within the aperture to the length of finished tubing 10b in the aperture is approximately inversely equal to the ratio of the wall thickness of the original tubing to the wall thickness of the final tubing. Thus, if the final wall thickness of the tubing is ⅕ that of the original, the final length will be approximately five times the original length of the tubing 10a. It will be appreciated that the aperture 15 is at least as long as the final length of the tubing 10b and the aperture 15 may be any length which may be found desirable and capable of being fabricated.

In the drawing there has been shown only three balls of increasing diameter utilized to work the tubing 10a into the finished tubing 10b. Normally, however, the number of balls used will depend upon a variety of factors, such as the amount of reduction desired in the wall thickness of the tubing 10a, the characteristics of the material of which the tubing is made and the elasticity of the material of the balls and the jig. While it is economically desirable to effect the reduction with the use of as few balls as possible, attempts to reduce the wall thickness in unduly large amounts may result in drawing the lip 13 into the tubing with the ball or axially stretching the tubing. In one specific example, it has been found that with copper beryllium tubing and with hardened steel balls and jig, the diameter of the balls should increase approximately .0005 inch in diameter.

The increasing diameter between sequentially used balls may vary from the above specific examples with other materials such as ferrous alloy tubing and with harder balls and jig such as those formed from "Carboloy" and thus the invention is not to be considered limited solely to the above recited increase in sequentially used ball diameters. It will be appreciated that in view of these relatively small dimensions that the showing of the wall thickness and the diameters of the balls in the drawing have been greatly exaggerated for clarity.

As successive balls are forced through the tubing, the tubing is generally work-hardened and this increases the amount of spring back, i.e. resilience of the material, so that the wall thickness of the tubing is not exactly equal to one-half the difference between the outside diameter of the tubing and the diameter of the ball after the ball has been forced through the tubing. As the material is further work-hardened the spring back increases and in order to compensate for the spring back and hardening of the material, the increasing in diameter between successively utilized balls may have to be decreased. In addition the selection of the diameter of the final ball depends upon this variable spring back factor and accordingly this ball generally has a slightly larger diameter than the final inside diameter of the tubing to compensate for spring back of the material to the desired final wall thickness.

The substantial amount of cold-working of the tubing 10a to produce the tubing 10b appears to favorably alter the characteristics of this material. Thus the hardness of the material increases as does its resilience with the amount of cold-working. At times the hardness of the tubing is increased by working it beyond a practical value and to reduce it, the tubing is annealed. The annealing may be done between different stages of reduction to facilitate further reduction of the wall thickness or to produce a final tubing 10b which has a desired value of hardness. In addition, the action of the ball is in effect a compressive force rather than a stretching force on the material and causes orientation and reduction of size of the grain of the material which enhances its suitability for further working operations on the tubing 10b such as corrugating it to form bellows.

It will thus be appreciated that there has been disclosed a simple yet effective method for fabricating tubing having relatively thin wall thickness from tubing which is presently commercially available and in which the variations in dimension of the finished tubing are maintained within a substantially close range.

Variations and modifications may be made within the scope of the claims and portions of the improvements may be used without others.

We claim:
1. The method of making very thin wall seamless tubing comprising providing a short thick-wall piece of seamless tubing, maintaining the outside diameter of the tubing substantially constant, reducing the wall thickness of the tubing by forcing at least one object having a diameter greater than the inside diameter of the tubing relatively axially through the tubing, and restraining the end of the tubing into which the object is introduced against movement with the object while leaving free for movement the other end of the tubing.

2. The method of making very thin wall seamless tubing comprising providing a short thick-wall piece of seamless tubing, maintaining the outside diameter of the tubing substantially constant, reducing the wall thickness of the tubing by forcing a plurality of objects relatively axially through the tubing with each sequentially forced object having a larger diameter than the previously forced object and with the first object having a diameter greater than the inside diameter of the tubing, and restraining the end of the tubing into which the objects are introduced against axial displacement with the objects while leaving free for movement the other end of the tubing.

3. The method of making very thin wall seamless tubing having substantially constant internal and external diameters comprising providing a short thick-wall piece of seamless tubing having one flared outer end, maintaining the outside diameter of the tubing substantially constant by containing the external surface of the tubing except for the flared outer end, introducing into the flared outer end and forcing at least one ball having a diameter greater than the inside diameter of the tubing relatively axially through the tubing to reduce the wall thickness of the tubing, restraining the flared end of the tubing against axial movement with the ball as the ball is forced therethrough while leaving free for movement the other end of the tubing, and severing the flared end from the tube.

4. The method of working tubing to produce tubing having a reduced and substantially constant wall thickness comprising the steps of providing a length of tubing having one flared outer end, maintaining the outside diameter of the tubing substantially constant by containing the external surface of the tubing except for the flared outer end, introducing into the flared outer end and forcing individually a plurality of balls relatively through the tubing with each sequentially forced ball having a larger diameter than the previously forced ball and with the first ball having a diameter greater than the inside diameter of the tubing to thereby reduce the wall thickness of the tubing, restraining the flared end of the tubing against movement with the balls while leaving free for movement the other end of the tubing, and severing the flared end from the tube.

5. The method of working tubing to produce tubing having a reduced and substantially constant wall thickness comprising the steps of providing a length of tubing having one flared outer end, containing the tubing except for the flared outer end in a cylindrical aperture with the diameter of the aperture being at least equal to the outside diameter of the tubing, introducing into the flared outer end and forcing individually a plurality of balls relatively axially through the tubing with each sequentially forced ball having a larger diameter than the previously forced ball and with the first ball having a diameter greater than the inside diameter of the tubing, restraining the flared end of the tubing to thereby reduce the wall thickness of the tubing against movement with the balls while leaving free for movement the other end of the tubing, and severing the flared end from the tube.

6. The method of making thin-walled seamless tubing comprising supporting a short thick-walled seamless tube against axial displacement by one end thereof with its other end free for axial movement and with its external surface contained against expansion, and then introducing a ball having a diameter greater than the inside diameter of the tube into the restrained end of the tube and relatively forcing the ball axially through the tube to lengthen and thin the wall of the tube.

References Cited in the file of this patent

UNITED STATES PATENTS

| | | |
|---|---|---|
| 1,402,508 | Lothrop | Jan. 3, 1922 |
| 1,466,953 | Loomis | Sept. 4, 1923 |
| 1,845,122 | Briney | Feb. 16, 1932 |
| 2,018,392 | Willink | Oct. 22, 1935 |
| 2,023,727 | Esser | Dec. 10, 1935 |
| 2,613,431 | McGee | Oct. 14, 1952 |
| 2,778,094 | Whitney | Jan. 22, 1957 |
| 2,883,738 | Morrow | Apr. 28, 1959 |
| 2,883,744 | Barnhart | Apr. 28, 1959 |

FOREIGN PATENTS

| | | |
|---|---|---|
| 327,933 | Great Britain | Oct. 22, 1930 |